(12) United States Patent
Bloomcamp et al.

(10) Patent No.: US 8,786,555 B2
(45) Date of Patent: Jul. 22, 2014

(54) FEEDBACK-PROVIDING KEYPAD FOR TOUCHSCREEN DEVICES

(75) Inventors: Eric M. Bloomcamp, Olathe, KS (US);
Shane R. Werner, Olathe, KS (US);
Warren B. Cope, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 987 days.

(21) Appl. No.: 12/053,135

(22) Filed: Mar. 21, 2008

(65) Prior Publication Data
US 2009/0237364 A1    Sep. 24, 2009

(51) Int. Cl.
| | |
|---|---|
| G06F 3/041 | (2006.01) |
| G09G 3/36 | (2006.01) |
| G09G 5/00 | (2006.01) |
| G06F 3/02 | (2006.01) |
| G06F 3/045 | (2006.01) |
| G06K 11/06 | (2006.01) |
| G08C 21/00 | (2006.01) |
| G06F 3/046 | (2006.01) |
| A63F 9/24 | (2006.01) |
| A63F 13/00 | (2014.01) |
| G06F 17/00 | (2006.01) |
| G06F 19/00 | (2011.01) |
| G06F 3/01 | (2006.01) |
| G06F 3/14 | (2006.01) |
| G06F 3/00 | (2006.01) |
| H03K 17/94 | (2006.01) |
| H03M 11/00 | (2006.01) |
| G09B 21/00 | (2006.01) |

(52) U.S. Cl.
USPC ........... 345/173; 345/104; 345/156; 345/168; 345/169; 345/170; 345/171; 345/172; 345/174; 178/18.01; 178/18.05; 178/18.07; 463/37; 463/38; 715/702; 715/864; 715/865; 715/866; 341/22; 434/112; 434/113; 340/825.19

(58) Field of Classification Search
USPC ............... 345/104, 156, 168–174; 178/18.01, 178/18.03, 18.05, 18.07; 463/37–38; 715/702, 864–866; 341/22; 434/112–113; 340/825.19
See application file for complete search history.

(56) References Cited

U.S. PATENT DOCUMENTS 6,988,247 B2 *  1/2006  Janevski .................... 715/835
7,253,807 B2 *  8/2007  Nakajima ................... 345/173
(Continued)

FOREIGN PATENT DOCUMENTS

EP          1717667 A1 * 11/2006
WO     2004051451 A1    6/2004
(Continued)

OTHER PUBLICATIONS

U.S. Appl. No. 60/957,033, filed Aug. 2007, Arneson et al.*

Primary Examiner — Alexander S Beck
Assistant Examiner — Karin Kiyabu

(57) ABSTRACT

Computer-readable media, computerized methods, and a touchscreen device manipulating user-input elements are provided. Generally, manipulation includes identifying a predefined configuration associated with a request received from a user and/or application, deriving configuration settings from the predefined configuration, and transmitting the configuration settings to an electromechanical device that adjusts a portion of user-input elements to an extended orientation and activates a portion of user-input elements. In embodiments, the extended user-input elements positioned in the extended orientation are activated, while the remainder are set to an idle condition. Typically, the extended user-input elements produce outwardly-extending protrusions expressed at a flexible touchpad incorporated in the touchscreen device. These outwardly-extending protrusions may replicate keys of a standard keyboard and correspond with the presently-running application implemented on the touchscreen device. User-initiated actuations of activated user-input elements provide a tactile feedback that substantially simulates a click generated by standard keyboard keys.

18 Claims, 7 Drawing Sheets

(56) References Cited

U.S. PATENT DOCUMENTS

| | | | |
|---|---|---|---|
| 2002/0196257 A1* | 12/2002 | Paolini et al. | 345/467 |
| 2003/0201974 A1* | 10/2003 | Yin | 345/158 |
| 2003/0231197 A1 | 12/2003 | Janevski | |
| 2004/0056877 A1 | 3/2004 | Nakajima | |
| 2007/0152982 A1* | 7/2007 | Kim et al. | 345/173 |
| 2008/0150911 A1* | 6/2008 | Harrison | 345/173 |
| 2009/0128503 A1* | 5/2009 | Grant et al. | 345/173 |
| 2009/0132093 A1* | 5/2009 | Arneson et al. | 700/282 |

FOREIGN PATENT DOCUMENTS

| | | | |
|---|---|---|---|
| WO | WO 2004051451 A2 * | 6/2004 | |
| WO | 2005015376 A | 2/2005 | |
| WO | WO 2005015376 A1 * | 2/2005 | |

* cited by examiner

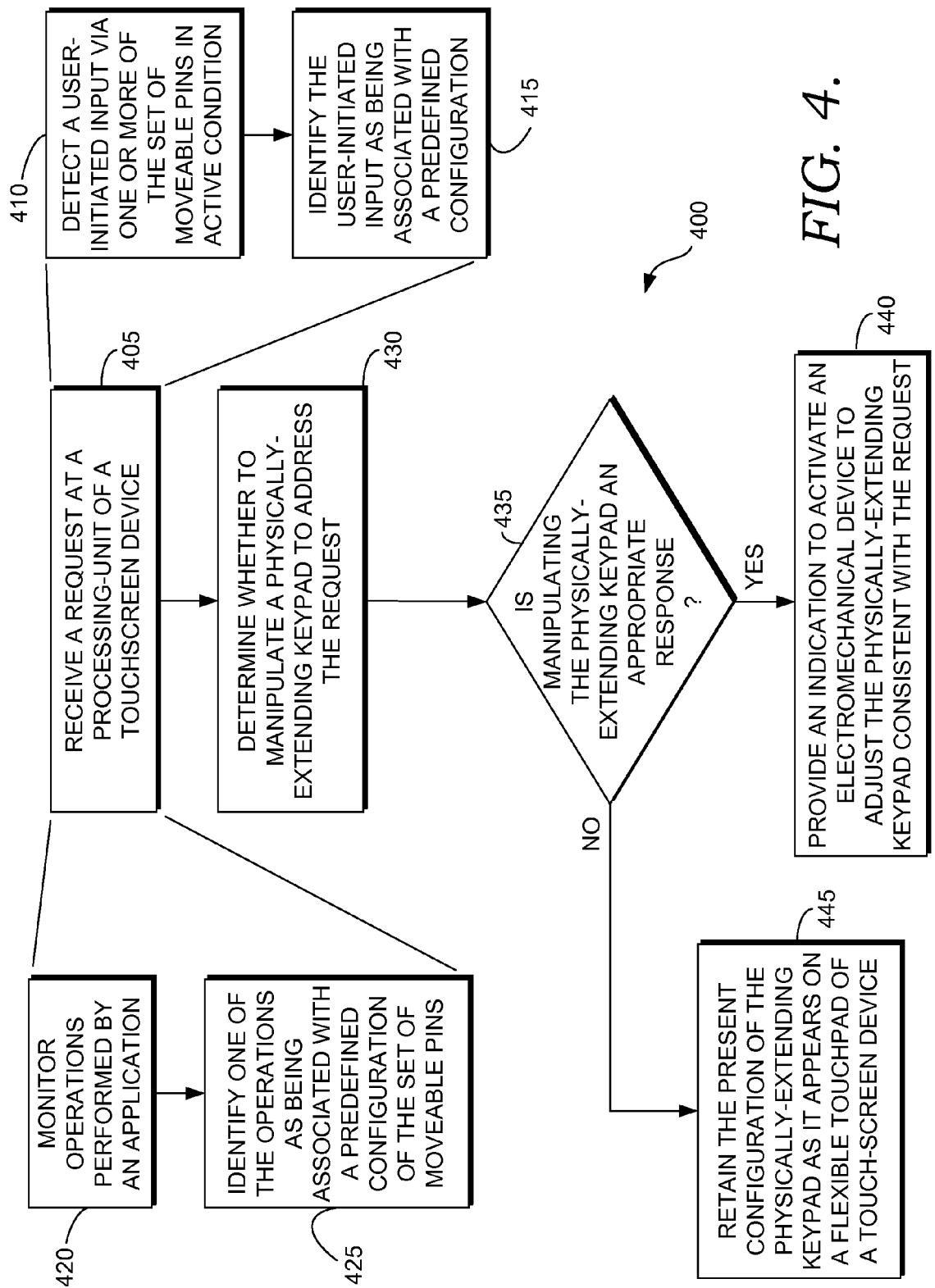

FEEDBACK-PROVIDING KEYPAD FOR TOUCHSCREEN DEVICES

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND

The present invention relates generally to the field of mobile devices, and more particularly to mobile devices that can manipulate content being presented on a user-interface (UI) display via activated user-input elements.

Mobile devices, including personal digital assistants (PDAs), handsets, and other computing devices, often rely on keys located on the surface of the device (e.g., miniaturized alphanumeric, "QWERTY" keyboard) to receive user-initiated inputs. Typically an input, such as entering text, is made by selecting a single-purpose key on the keyboard that is effective for a specific operation, regardless of the application being presently implemented. Because these keys cannot adapt to an application that is currently running (e.g., dialing versus text entry), an appropriate surface area must be designated on a mobile device to house a full keyboard to accommodate inputs for various applications. Thus, these mobile devices with full keyboards consume an exorbitant spatial area that is not practical in the compact mobile environment and create a disconnect between a key layout of the mobile device and the functionality of a running application.

Some mobile devices, with larger display areas, employ a touchscreen for offering onscreen keyboards that accept user-initiated inputs at keys presented therein. These keys may adapt to the application being performed by the mobile device. But, these onscreen keys are nondistinct from the remainder of the screen and lack the texture and feel (e.g., tactile feedback) of actual keys. This deficiency generally results in reduced speed and accuracy when inputting information at the screen. Accordingly, employing an onscreen set of actual keys that can adapt to a variety of applications, and can be continually updated, would provide a robust method of facilitating user control over the functionality of a plurality of applications and enhance a user's computing experience when using a touchscreen-enabled computing device.

SUMMARY

This Summary is provided to introduce a selection of concepts in a simplified form that are further described below in the Detailed Description. This Summary is not intended to identify key features or essential features of the claimed subject matter nor is it intended to be used as an aid in determining the scope of the claimed subject matter. The present invention is defined by the claims.

Embodiments of the invention have several practical applications in the technical arts, including providing a touchscreen device (e.g., mobile handset, flat-panel monitor) having flexible touchpad and user-input elements to manipulate the flexible touchpad to create a physically-extending keypad thereon. The physically-extending keypad (e.g., touch-sensitive keys) facilitates, among other things, user control over an application presently running on the touchscreen device. Initially, a request is received at the touchscreen device that may include presentation data and/or configuration settings. The request may be detected from operations performed by an application running on the touchscreen device, initiated by a user entering an input at the touchscreen device, or provided by any other method for generating an indication to execute a particular function. Upon receipt, the touchscreen device conveys the presentation data to the flexible touchpad that presents content (e.g., alphanumeric characters) at a user interface (UI) display in accordance with the presentation data. The configuration settings are accessed from the request and conveyed to an electromechanical device that manipulates a portion of the user-input elements (e.g., set of moveable pins) to extend, thereby expressing at the flexible touchpad a physically-extending keypad consistent with the request. In an exemplary embodiment, the user-input elements in the extended orientation are set to an active condition such that user-initiated actuation thereof generates an input signal. In addition, outwardly-extending protrusions of one or more of the user-input elements in the extended orientation may be positioned proximately to alphanumeric characters presented on the UI display, thereby indicating the type of input assigned to the outwardly-extending protrusions comprising the physically-extending keypad. As such, the appearance and tactile feedback provided by an actual keyboard, dial pad, and the like, may be replicated by the physically-extending keypad expressed at the flexible touchpad, which is adaptable based on the received request.

Embodiments generally relate to one or more computer-readable media having computer-executable instructions embodied thereon that, when executed, perform a method for manipulating a set of moveable pins to produce a physically-extending keypad (e.g., alphanumeric pattern of outwardly-extending protrusions expressed at the flexible touchpad). More particularly, a first aspect of an embodiment is directed to a processing unit of the touchscreen device for receiving an application-generated, or user-initiated, request. Initially, a determination of whether manipulating the physically-extending keypad is appropriate to address the request is performed. In one instance, determining includes identifying whether the request is associated with a predefined configuration of the set of movable pins, where the predefined configuration specifies the portion of the set of movable pins to adjust to the extended orientation and which of the set of movable pins to set to an active condition. If appropriate, an indication to activate an electromechanical device to adjust a portion of the set of movable pins to an extended orientation is provided. Typically, the portion of the set of movable pins in the extended orientation influences an appearance of a flexible touchpad incorporated within the touchscreen device. Accordingly, when in the extended orientation, the portion of the set of movable pins produces the physically-extending keypad consistent with the request.

A second aspect of an embodiment takes the form of a touchscreen device for manipulating one or more user-input elements according to configuration settings. Generally, the touchscreen device includes a processing unit, an electromechanical device, the one or more user-input elements, and a flexible touchpad. Initially, the processing unit communicates presentation data to the flexible touchpad and executes a manipulation procedure. The manipulation procedure, in one instance, includes the following: receiving one or more requests; and accessing configuration settings based on processing the one or more requests. The electromechanical device manipulates a portion of the one or more user-input elements to an extended orientation and the other to a retracted orientation consistent with the configuration settings. The one or more user-input elements provide a tactile feedback, in the extended orientation, when actuated by a user. In embodiments, tactile feedback is generated by a spring-loaded mechanism employed by the one or more user-input elements that imitate a click generated upon pressing a key on a normal electromechanical keyboard. In one instance, the one or more user-input elements are embodied as a set of movable pins that function as touch-sensitive keys, where the set of movable pins are disposed in a substantial perpendicular-spaced relation to the flexible touchpad. The flexible touchpad renders a user-interface (UI) display that is controlled, in part, by the presentation data, and for expressing outwardly-extending protrusions generated by the manipulation of the one or more user-input elements. Generally, the flexible touchpad is a self-illuminating film (e.g., organic light-emitting diode) that projects the UI display without the assistance of backlighting and that substantially overlays the one or more user-input elements. In operation, the flexible touchpad may express the outwardly-extending protrusions as a replication of a physically-extending keypad, and displays at least one character in association with each of the outwardly-extending protrusions in accordance with the configuration settings.

In a further aspect, embodiments of the invention are directed toward a computerized method for manipulating user-input elements to manage outwardly-extending protrusions expressed at a flexible touchpad incorporated in a touchscreen device. Initially, the method includes receiving a request to manipulate the expression of the outwardly-extending protrusions. The request is processed by executing a manipulation procedure for controlling a portion of the user-input elements. In one instance, the manipulation procedure includes, but is not limited to, the following: accessing configuration settings based on processing the one or more requests; and manipulating the portion of the user-input elements in accordance with the configuration settings, thereby affecting the outwardly-extending protrusions. In another instance, the manipulation procedure further includes identifying the configuration settings as indicating an adjustment of the portion of the user-input elements to a text-entry mode and manipulating the portion of the user-input elements such that the outwardly-extending protrusions replicate a physically-extending keypad. A user-interface (UI) display is rendered at the flexible touchpad according to the request. In an exemplary embodiment, rendering includes extracting presentation data from the request, communicating the presentation data to the flexible touchpad, and rendering the UI display at the flexible touchpad to present one or more characters in association with each of the outwardly-extending protrusions. Typically, the one or more characters visually indicate which of the user-input elements are in an active condition. Alternatively, absence of an associated character, and/or positioned in a retracted orientation, indicates which of the outwardly-extending protrusions reside in an idle condition.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein:

FIG. 4 is a flow diagram showing a method manipulating a set of moveable pins to produce a physically-extending keypad, in accordance with an embodiment of the present invention;

DETAILED DESCRIPTION

Figure 5:
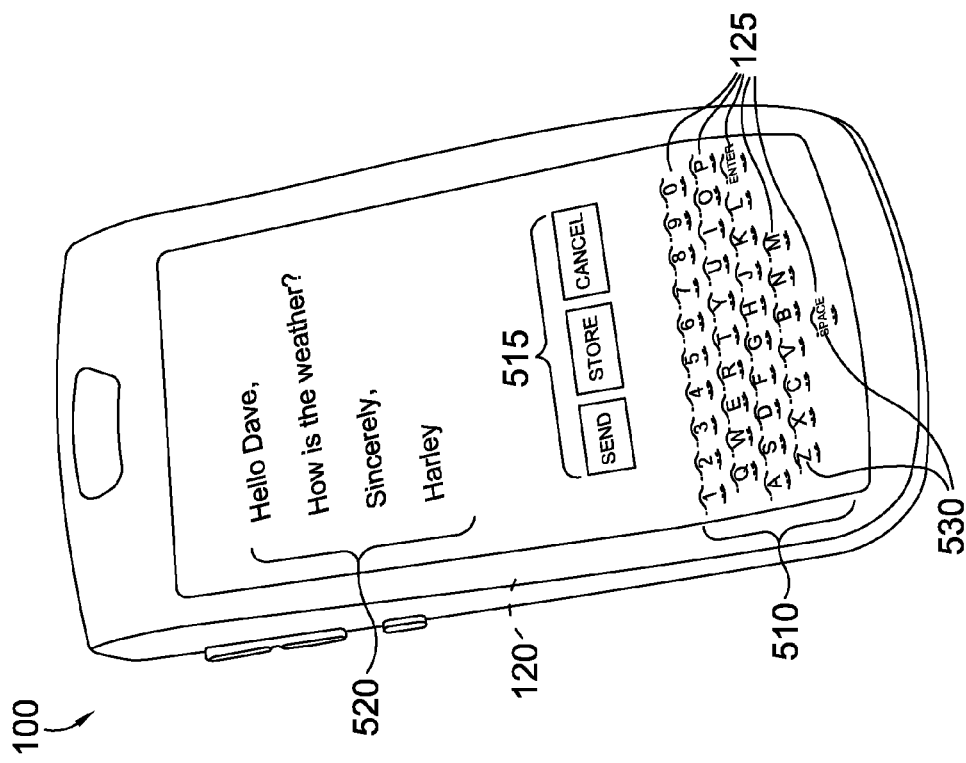
FIG. 5 is an exemplary physically-extending keypad accommodated on a touchscreen device with an appearance that replicates an actual keyboard, in accordance with an embodiment of the present invention.

Embodiments provide systems and methods for manipulating user-input elements according to a request provided to a touchscreen device from a user or a presently-running application thereon. Generally, manipulation includes identifying a predefined configuration associated with the request, deriving configuration settings from the predefined configuration to be transmitted to an electromechanical device for adjusting a portion of the user-input elements to an extended orientation, and activating user-input elements based on the request. In an exemplary embodiment, the portion of the user-input elements positioned in the extended orientation are placed in an active condition, according to the request, while a remainder of the user-input elements are placed in the idle condition. Further, the extended orientation produces outwardly-extending protrusions on a flexible touchpad incorporated in the touchscreen device. Typically, these outwardly-extending protrusions replicate keys of a standard keyboard and correspond with expected inputs of the presently-running application implemented on the touchscreen device. Accordingly, an intuitive layout of the user-input elements in the active condition is provided that facilitates ease of control over a broad range of various applications. Additionally, the user is alerted to which of the user-input elements are in the active condition upon perceiving a visual indication (e.g., extended orientation) therefrom. Even further, user-initiated actuation of the user-input elements in the active condition provides a tactile feedback that substantially imitates a click generated by keys of a standard keyboard.

Acronyms and Shorthand Notations

Throughout the description, several acronyms and shorthand notations are used to aid the understanding of certain concepts pertaining to the associated system and services. These acronyms and shorthand notations are solely intended for the purpose of providing an easy methodology of communicating the ideas expressed herein and are in no way meant to limit the scope of the present invention. The following is a list of these acronyms:

| JAD | Java Application Descriptor |
|-----|------------------------------|
| JAR | Java Archive |
| PDA | Personal Digital Assistant |
| XML | Extensible Markup Language |

Further, various technical terms are used throughout this description. A definition of such terms can be found in *Newtons Telecom Dictionary* by H. Newton, $22^{nd}$ Edition (2006). These definitions are intended to provide a clearer understanding of the ideas disclosed herein but are not intended to limit the scope of the present invention. The definitions and terms should be interpreted broadly and liberally to the extent allowed the meaning of the words offered in the above-cited reference.

As one skilled in the art will appreciate that embodiments may be embodied as, among other things, a computer-program product. Accordingly, the embodiments may take the form of a hardware embodiment, a software embodiment, or an embodiment combining software and hardware. In one embodiment, the present invention takes the form of a computer-program product that includes computer-useable instructions embodied on one or more computer-readable media.

Computer-readable media include both volatile and nonvolatile media, removable and nonremovable media, and contemplates media readable by a database, a switch, and various other network devices. By way of example, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Computer readable media, computerized methods, and touchscreen devices are provided for manipulating a portion of user-input elements. In exemplary embodiments, "user-input elements" are components accommodated by the touchscreen device that are configured to receive inputs from a user. In one embodiment, the user-input elements are moveable pins that are adjusted between a retracted orientation and an extended orientation by an electromechanical device. The method of adjustment may be by mechanical techniques, magnetic forces, or any other suitable method for physically positioning components which is well known in the relevant industry, as will be discussed more fully below. When in the retracted orientation, the user-input elements typically form a solid hard surface. Alternatively, when adjusted to the extended orientation, the user-input elements typically act as touch-sensitive keys that provide a tactile feedback upon actuation. Additionally, upon actuation, the user-input elements are adapted to receive an input (e.g., key event) that is consequently conveyed to a presently-running application on the touchscreen device. In one instance, the "key event" triggers a particular command associated with the presently-running application according to the configuration setting of the selected user-input elements. Accordingly, the function that each user-input element (e.g., key) initiates is updatable and may be defined by the presently-running application.

Although discussed above as moveable between an extended and a retracted orientation, it should be understood and appreciated by those of ordinary skill in the art that other orientations of the user-input elements could be provided for and achieved by the electromechanical device (e.g., partially extended orientation), and that the invention is not limited to those release mechanisms shown and described. Further, although described as adaptable to facilitate functions that control the presently-running application, the user-input elements, via sensing elements coupled thereto, may be multifunctional and/or may control other aspects of functionality related to the touchscreen device beyond the presently-running application.

Generally, the user-input elements are manipulated based on requests received at a processing unit of the touchscreen device. These requests may be received from a user, a presently-running application (e.g., locally-performing program, application on a remote server that is communicatively coupled to the touchscreen device), or any other program residing on the touchscreen device. The use of "requests" is not intended to be limited to commands directed only toward user-input elements, but to any signal that affects computing functionality and output expressed by the touchscreen device. For instance, requests may include information related to presentation data and/or configuration settings.

The presentation data is display-based information generally conveyed from a processing unit (e.g., processing unit 205 of FIG. 2) to a flexible touchpad, via a data transmission connection, for directing which content is presented at a user interface (UI) display rendered on the flexible touchscreen. In one instance, the content may be alphanumeric characters associated with the outwardly-extending protrusions expressed on the flexible touchpad (see FIGS. 5-7). In other instances, the content may be video media that is presented in cooperation with the outwardly-extending protrusions (see FIGS. 8 and 9), or independently thereof.

The configuration settings are information related to configuration of a physically-extending keypad, or other pattern generated by the outwardly-extending protrusions, that is generally conveyed from the processing unit to an electromechanical device, via a data transmission connection, for directing which of user-input elements are to be manipulated to contact and deform the flexible touchscreen. In an exemplary embodiment, the configuration settings are derived from a predefined configuration retrieved by the processing unit in response to the request. By way of example only, the predefined configuration may include a standard alphanumeric keypad (see FIGS. 5 and 7), a dial pad (see FIG. 6), or moveable protrusions that act in conjunction with video media (see FIGS. 8 and 9). In one instance, the configuration settings may influence which outwardly-extending protrusions are statically expressed on the flexible touchpad (see FIGS. 5-7). In other instances, the configuration settings may control the outwardly-extending protrusions in conjunction with video media (see FIGS. 8 and 9), or independent of the video media (e.g., in response to user-initiated actuation of the flexible touchpad).

Figure 7:
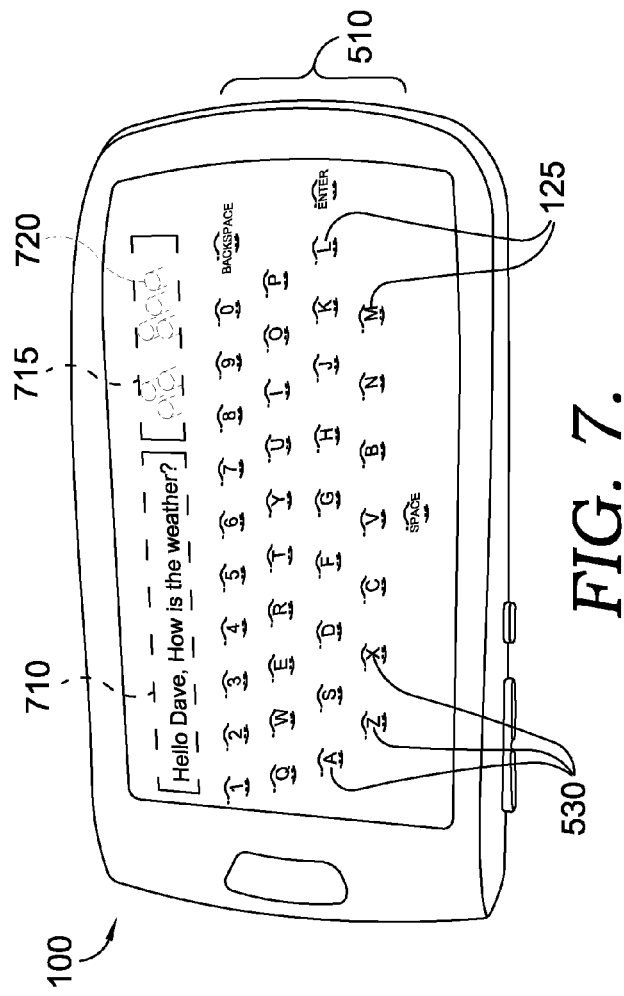
FIG. 7 is an exemplary physically-extending keypad accommodated on a touchscreen device configured in a text-entry mode and demonstrating a feature for providing content output via outwardly-extending protrusions expressed at a flexible touchpad, in accordance with an embodiment of the present invention.

In an exemplary embodiment, the configuration settings are related to a particular mode that is initiated in accordance with the request. The mode determines which of the user-input elements are set to an active condition and which are set to an idle condition. Generally, in the active condition, the sensing elements employed on active user-input elements are instantiated to communicate indications of user actuations to the processing unit. Alternatively, in the idle condition, the sensing elements employed on idle user-input elements are inactive and resist communicating user actuations thereof to the processing unit. These modes may be either independent of the positional state of the user-input elements (e.g., Braille expressed by the extended and retracted user-input elements in FIG. 7 is not in the active condition; all user-input elements are in the active mode in FIG. 9), or corresponding to the positional state of the user-input elements (e.g., the extended "key-style" user-input elements are in the active condition and the retracted user-input elements are in the idle condition in FIGS. 5-7).

A device for manipulating user-input elements by processing a request will now be described with reference to the accompanying drawings. The drawings and the associated descriptions are provided to illustrate embodiments of the present invention and not to limit the scope thereof. Reference in the specification to an "embodiment" is intended to indicate that a particular feature, structure, or characteristic described in connection with the embodiment is included in at least one embodiment of the invention. Further, the appearance of the phrase "in one embodiment" in various places in the specification are not necessarily all referring to the same embodiment.

Figure 1:
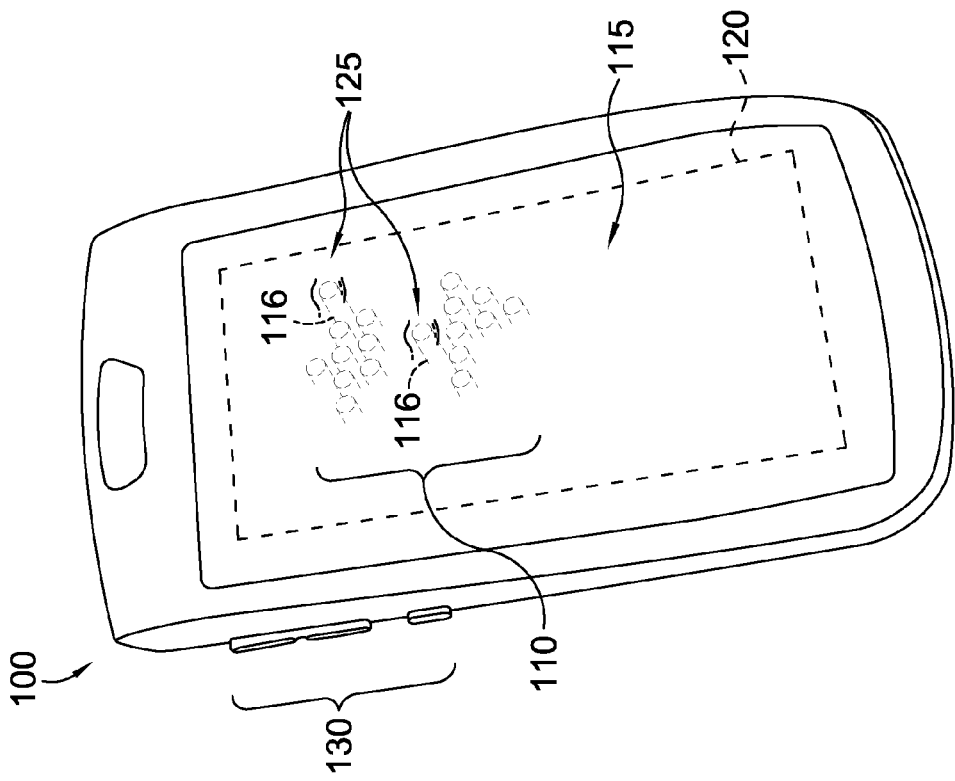
FIG. 1 is an exemplary set of user-input elements accommodated on a touchscreen device with a portion of the user-input elements adjusted to an extended orientation, in accordance with an embodiment of the present invention.

Referring to the drawings in general, and initially to FIG. 1 in particular, a touchscreen device 100 with tactile feedback utility will now be described. Initially, an exemplary set of user-input elements 110 accommodated on a touchscreen device 100 with a portion of the user-input elements 110 adjusted to an extended orientation 116 is shown, in accordance with an embodiment of the present invention. Additionally, in the embodiment illustrated, the touchscreen device 100 employs few actual buttons 130 but relies on a large screen having an expansive UI display 120 area as the primary source for user-initiated input. As such, the touchscreen device 100 offers the flexibility of playing video and other multimedia content on the entire UI display 120 as well as providing text-entry functionality via outwardly-extending protrusions 125, or "keys," generated by the user-input elements 110 adjusted to the extended orientation 116.

Figure 2:
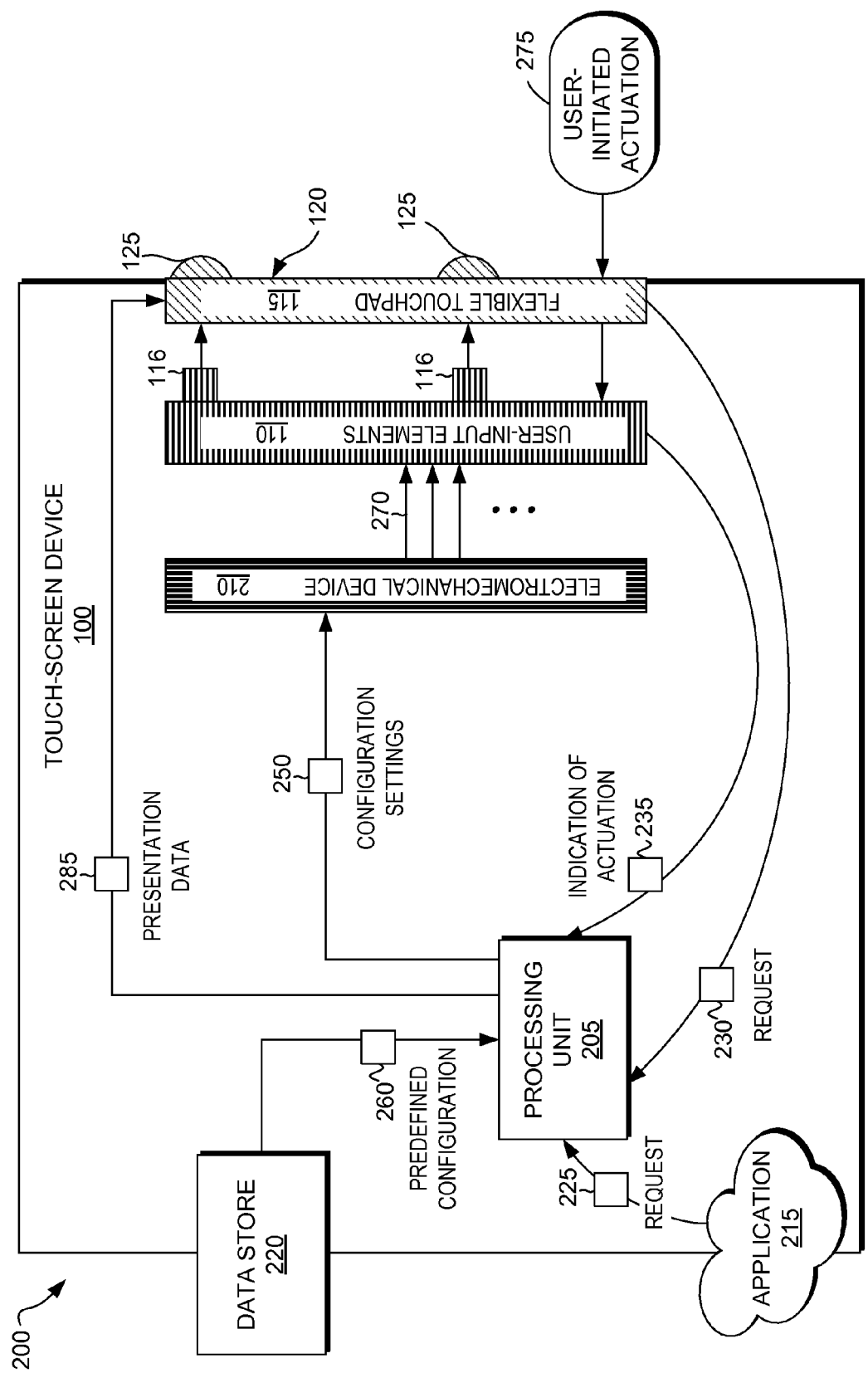
FIG. 2 is a schematic diagram depicting the components of an exemplary touchscreen device for use in implementing embodiments of the present invention.

Turning now to FIG. 2, it should be noted that throughout the drawings, reference numerals are reused to indicate correspondence between referenced elements. A schematic diagram 200 depicting components of the touchscreen device 100 for use in implementing embodiments of the present invention is illustrated in FIG. 2 and will be described in conjunction with FIG. 1. The schematic diagram 100 includes, in one embodiment, a processing unit 205, an electromechanical device 210, the user-input elements 110, a flexible touchpad 115, an application 215, and a data store 220.

The application 215 and the data store 220 are positioned both within and outside the touch-screen device 100 to indicate that the actual location of the application 215 and/or the data store 220 may be local to, or remote from the touchscreen device 100. For instance, the data store 220 may be housed in a remote server (not shown) and/or the application 215 may be a program presently running on a separate computing device (not shown) that is communicatively connected to the touchscreen device 100 via a network (which may actually be multiple networks). In embodiments, the data store 220 is configured to store information associated with the touch-screen device 100 and is searchable for such information. For instance, the information may include predefined configurations 260 that may be identified by interrogating the data store with one or more requests, as more fully discussed below.

The network may comprise a wired connection, a wireless connection, or a combination thereof. In addition, the network may include, without limitation, one or more wLANs and/or wWANs. Such networking environments are commonplace in offices, enterprise wide computer networks, intranets, and the Internet; thus, the network is not further described herein. In operation, the touchscreen device 100 receives communications from, and provides communications to, the data store 220 and/or the application 215 via the network, if either is embodied on a component external to the touchscreen device 100.

Although the various components of FIG. 2 are shown with lines for the sake of clarity, in reality, delineating various components is not so clear, and metaphorically, the lines would more accurately be grey or fuzzy. Further, although some components of FIG. 2 are depicted as single blocks, the depictions are exemplary in nature and in number and are not to be construed as limiting (e.g., although only one processing unit 205 is shown, many more may be operably coupled to the electromechanical device 210).

The touchscreen device 100 may be any type of device having communications capability. Touchscreen device 100 may be, or variously referred to as, a handheld device, mobile handset, consumer electronics device, cell phone, personal digital assistant (PDA) unit, and the like. In addition, each touchscreen device 100 may be a device that supports a flat-panel display that may or may not be provisioned with the network. By way of example only, the touchscreen device 100 may be a monitor adapted for mounting in an automobile headrest, a display screen on an oven, or any other electronic device equipped to present a UI display.

The processing unit 205, as shown in FIG. 2, may take the form of various types of processors that are commonly deployed in a personal computing device, a handheld device, a consumer electronic device, and the like. In embodiments, the processing unit 205 is generally configured to perform a manipulation procedure that includes, but is not limited to, the following: receiving a request 225 from the application 215, a request 230 from the flexible touchpad 115, and/or a request (arriving in the form of an indication of actuation 235) from the user-input elements 110; process the request to determine configuration settings 250; and convey the configuration settings 250 to the electromechanical device 210 for execution thereof. The request 225 and 230 may be any transferable information that is received by the processing unit 205.

By way of example only, the request 225 may be an indication from the application 215. The indication from the application 215 may be retrieved upon monitoring operations performed by the application 215 and identifying one or more operations that are associated with a predefined configuration 260 of the user-input element 110. In one instance, the data store 220 may be interrogated with data related to the operations to determine whether the predefined configuration 260 corresponds thereto. Upon retrieving the predefined configuration 260, the configuration settings 250 may be drawn therefrom. In one embodiment, if the application 215 is an instant-messaging program, operations monitored by the processing unit 205 may indicate that the application 215 will enter a text-entry mode. Subsequently, the data store 220 is searched for an appropriate predefined configuration 260 that supports the text-entry mode. Accordingly, in this embodiment, the configuration settings 250, which may be a command to the electromechanical device 210 to adjust the user-input elements 110 to replicate a physically-extending keypad, are extracted from characteristics of the appropriate predefined configuration 260. In a variation of this example, the replication of the physically-extending keypad may be an alphanumeric.

In a second example, the request 230 may be a user-initiated actuation 275 from a user, entered at the flexible touchpad 115, to dial a phone number or to create an email message. In this example, the flexible touchpad 115 may be a resistive touchscreen and entering the request 230 may be an actuation at the resistive touchscreen by a user's finger or stylus. Accordingly, the configuration settings 250 may be a command to the electromechanical device 210 to adjust the user-input elements 110 to express a dial pad or a keyboard, respectively.

In a third example, the request may be created upon receiving an indication of actuation 235 from the user-input elements 110 in the active condition. In one particular instance, a user-initiated input via one or more of the set of moveable pins, which comprise the user-input elements, is detected. This detected input is identified as being associated with a predefined configuration 260 of the user-input elements 110. If the predefined configuration 260 is distinct from the present configuration of the user-input elements 110, configuration settings 250 are generated. Accordingly, in this example, the configuration settings 250 may be derived from the indication of actuation 235 (e.g., typing on the physically-extending keypad), or characteristics of the predefined configuration 260, and provided to the electromechanical device 210 to adjust the physical state and/or mode of the user-input elements 110.

Upon receiving the request 225 or 230, or request based on the indication of actuation 235, the processing unit 205 may process the request to determine configuration settings 250, as discussed above. In one instance, processing the request 225, 230, or 235 includes determining whether manipulating the positional state or mode (e.g., physically-extending keypad) of the user-input elements 110 is appropriate to address the request 225, 230, or 235. By way of example, the request 225, 230, or 235 may be an indication to enter text, dialing a number, entering an application (e.g., application 215) that uses a similar configuration of the user-input elements 110 as is presently employed, or any other input that does not trigger an adjustment to the positional state or mode of the user-input elements 110. Alternatively, the request 225, 230, or 235 may be an indication to launch a new application that corresponds to an input interface that is not presently configured on the flexible touchpad 115. In this example, the processing unit 205 will provide an indication, in the form of configuration settings 250, to the electromechanical device 210 to manipulate the user-input elements 110. It should be appreciated and understood that the configuration settings 250 may be derived from the request 225, 230, or 235 itself, generated in accordance with characteristics of the predefined configuration 260 as identified by the request 225, 230, or 235, or produced in any other fashion to accurately represent aspects of the request 225, 230, or 235 related to manipulation of the user-input elements 110.

In addition to accessing or generating the configuration settings 250 and conveying them to electromechanical device 210, the manipulation procedure executed by the processing unit 205 may include extracting presentation data 285 from the request 225 or 235. The presentation data 285, as more fully discussed above, is display-based information that is communicated to the flexible touchpad 115. Accordingly, upon receipt of the presentation data 285, the flexible touchpad 115 may render a UI display 120 that is partially controlled by the presentation data 285. By way of example, the presentation data 285 may direct the flexible touchpad 115 to present alphanumeric characters at the UI display 120 in the pattern of a keyboard, dial pad, and the like. These alphanumeric characters may be displayed in association with outwardly-extending protrusions 125 expressed at the flexible touchpad 115. Accordingly, the alphanumeric characters identify the function of each "key" that is generated by the outwardly-extending protrusions 125 (see FIGS. 5-7). Further, the alphanumeric characters may assist a user in selecting appropriate areas of the flexible touchpad to actuate by visually indicating which user-input elements 110 are in an active condition. In an exemplary embodiment, the alphanumeric characters are rendered at the UI display 120 in a special format such that they are readable on a deformed surface of the flexible touchpad 115, where the deformed surface is a result of the outwardly-extending protrusions 125.

Generally, the electromechanical device 210 is configured to manipulate all, or a portion, of the user-input elements 110 to an extended orientation 116, a retracted orientation, a partially extended orientation, and the like. Typically, the user-input elements 110 are adjusted in a manner consisted with instructions within the configuration settings 250. Accordingly, the adjustment affects the outwardly-extending protrusions 125 expressed at the flexible touchpad 115. In other embodiments, the electromechanical device 210 is adapted to enable or disable sensing devices coupled to the user-input elements 110, thereby adjusting the user-input elements 110 between an active condition and an idle condition.

In a first embodiment, the electromechanical device 210 is an apparatus that employs extension components (e.g., compression springs, compressible materials, and the like) and retaining components (e.g., locking mechanisms, magnets) to manipulate the positional state of each of the user-input elements. In operation, the retaining components may release a portion of the user-input elements 110 such that the extension components are free to adjust the positional state of the portion to an extended orientation 116. This portion of user-input elements 110 in the extended orientation 116 may be automatically activated, according to the configuration settings 250, such that they are functional keys. In this way, automatically activating (i.e., setting the user-input elements 110 to the active condition) enables the "functional keys" to provide at least one command to the application 215, the processing unit 205, or any other appropriate component of the touchscreen device 100. As discussed above, the functional keys can be positioned in a pattern that replicate keys of a standard keyboard, dial pad, etc. Conversely, the remainder of the user-input elements 110 held by the retaining components in the retracted position may be set to the idle condition. This configuration allows a user to enter information at a virtual keyboard on the flexible touchpad 115 of the touchscreen device 100 in a similar fashion to entering information at hardkeys on an actual keyboard that are activated by physical contact.

Persons familiar with the field of the invention will realize that although the extended orientation 116 and the active condition are described as being coupled, the scope of the invention may embrace various configurations which are different from the specific illustrated embodiment above. Therefore it is emphasized that embodiments of the invention are not limited only to the coupled embodiment but include a wide variety of configurations, which fall within the spirit of the claims. For instance, all the user-input elements 110 may be set to the active condition regardless of their positional state. In another instance, a portion of the user-input elements 110 in the extended orientation 116 and a portion of the user-input elements 110 in the retracted orientation are set to the active condition, thereby decoupling the orientation and condition of the user-input elements 110.

In a second embodiment, the electromechanical device 210 is a magnetic field-inducing device that employs electromagnetic components (e.g., solenoids, coiled wire, and the like) to manipulate the positional state of each of the user-input elements 110. In operation, the electromagnetic components apply a magnetic field 270 that manipulates the positional state of the user-input elements 110 to an orientation within the range between, and including, the retracted orientation and the extended orientation 116. As such, an infinite number of positional states may be achieved by the user-input elements 110 as governed by the magnetic field 270. As discussed above, these positional states may be coupled to, or decoupled from, the active and idle conditions of the user-input elements 110, based on the configuration setting.

Although two different configurations of the electromechanical device 210 have been described, it should be understood and appreciated by those of ordinary skill in the art that other devices that manipulate a positional state of the user-input elements 110 could be used, and that the invention is not limited to those electromechanical devices shown and described. For instance, embodiments of the present invention contemplate a purely mechanical device, a purely electrical device, hydraulic devices, pneumatic devices, or any combination thereof.

As more fully discussed above, the user-input elements 110 are configured to provide a tactile feedback upon receiving the user-initiated actuation 275. In an exemplary embodiment, the user-input elements 110 are movable pins, or pin-shaped members. In an exemplary embodiment, the movable pins are disposed in a substantially perpendicular relationship to the overlaying flexible touchpad 115. Typically, the user-input elements 110 employ a feedback component that provides the tactile feedback sensation. In one instance, the feedback component is a spring-loaded mechanism that provides a tactile feedback which simulates a "click" response similar to that generated upon depressing a key of an actual keyboard. In another instance, the feedback component is incorporated in the electromechanical device 210. Additionally, a mild vibration, a low-voltage shock, a visual stimulus presented on the UI display 120, and/or an audible signal may accompany the tactile feedback.

Generally, some aspects of activating the user-input elements include receiving and processing configuration settings 250 at the electromechanical device 210 and/or user-input elements 110, and enabling or disabling sensing devices disposed on the user-input elements 110 in accordance with instructions within the configuration settings 250. As discussed above, the phrase "configuration settings" is not meant to be limiting, but to encompass a broad scope of script that influences the manipulation and/or function of the user-input elements 110. In one embodiment, the configuration settings 250 include a mapping structure for assigning one or more commands to each of the user-input elements 110 in the active condition. For instance, a group of user-input elements 110 may be set to the active condition (i.e., enabling the sensing devices coupled to each of the group of user-input elements 110) such that the sensing devices attached to the activated group provide a signal when actuated. This signal is associated with a command via the mapping structure. By way of example, if the activated group of user-input elements 110 combine to form a functional "A" key within a physically-extending keypad (see FIGS. 5-7), the signal generated upon actuating the activated group is mapped to a command to "input the alphanumeric key 'A.'" This command may be routed to the application 215, to the flexible touchpad 115 for displaying "A" on the UI display 120, or to any other component of the touchscreen device 100. Although a single embodiment is discussed above, other embodiments of the present invention contemplate mapping any commands common in the relevant field to the signals generated by enabled sensing devices.

The flexible touchpad 115 is an elastic component that substantially overlays the user-input elements 110 and is in partial communicative contact therewith. In an exemplary embodiment, the flexible touchpad 115 is a self-illuminating film that projects the UI display 120 without the assistance of backlighting. By way of example, the self-illuminating film is a flexible organic light-emitting diode (FOLED), an organic electroluminescence (OEL), a light-emitting polymer (LEP), or any emissive electroluminescence layer composed of a film or organic compounds. In this way, the flexible touchpad 115 may be a display screen that is adapted to deform when contacted by the user-input elements 110 and render a UI display 120. Accordingly, in operation, the user-input elements 110 in the extended position 116 contact and deform the flexible touchpad 115 such that the flexible touchpad 115 expresses outwardly-extending protrusions 125 associated with the extended user-input elements 110. Meanwhile, flexible touchpad 115 can render the UI display 120 (e.g., presenting media content as indicated by the presentation data 285) above and between the outwardly-extending protrusions 125.

Further, the flexible touchpad 115 may support input capabilities. For instance, the flexible touchpad 115 comprises a resistive touchscreen that may be triggered by a stylus or actuated by a user's finger-action, a capacitive touchscreen that provides a controlled electric field at the UI display 120 that is triggered by an electrical interference, and the like. As such, the user-initiated actuation 275 at the UI display 120 can generate two inputs; the request 230 from the flexible touchpad 115 and the indication of actuation 235 from the user-input elements 110 (presumably in the active condition).

Figure 3:
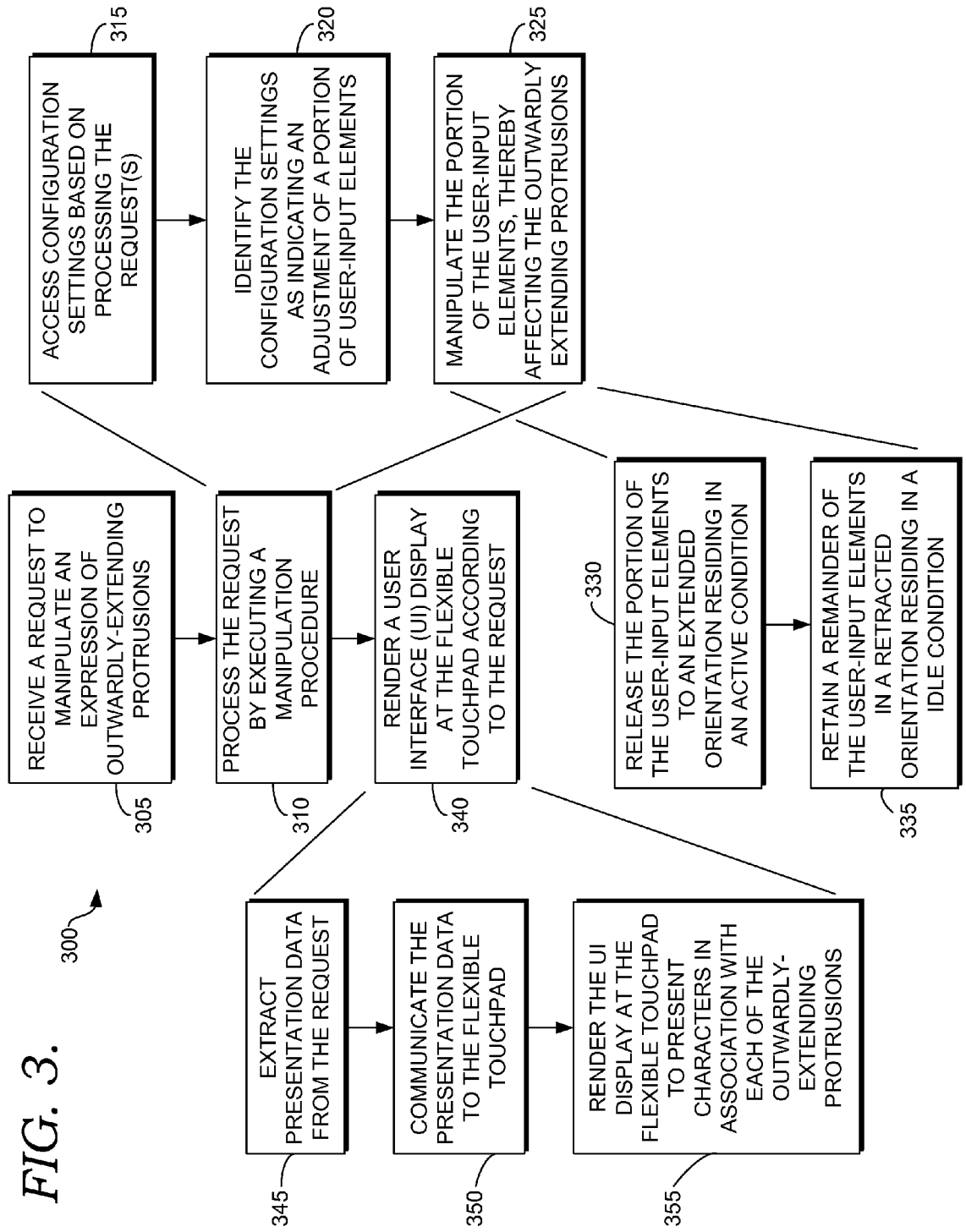
FIG. 3 is a flow diagram showing an overall method for manipulating user-input elements to manage outwardly-extending protrusions expressed at a flexible touchpad incorporated in the touchscreen device, in accordance with an embodiment of the present invention.

With reference to FIG. 3, a flow diagram is illustrated that shows an overall method 300 for manipulating user-input elements to manage outwardly-extending protrusions expressed at a flexible touchpad incorporated in the touchscreen device, in accordance with an embodiment of the present invention. Initially, a request to manipulate outwardly-extending protrusions expressed by the flexible touchpad is received, as indicated at block 305. As indicated at block 310, the requests are processed upon executing a manipulation procedure (e.g., utilizing the processing unit 205 of FIG. 2). Generally, the manipulation procedure includes, but is not limited to, the following procedures: accessing configuration settings based on processing the requests (see block 315); identifying the configuration settings as indicating an adjustment of a portion of user-input elements (see block 320); and manipulating the portion of the user input elements in accordance with the configuration settings, thereby affecting the expression of outwardly-extending protrusions (see block 325). Manipulating the portion of user-input elements may include the steps of releasing the portion of the user-input elements to an extended orientation (see block 330), where the released portions are set to an active condition, and retaining the remainder of the user-input-elements in a retracted orientation (see block 335), where the retracted remainder is set to an idle condition.

As indicated at block 340, a UI display is rendered at the flexible touchpad according to the request. In a particular instance, rendering includes, but is not limited to, the following procedures: extracting presentation data from the request (see block 345); communicating the presentation data to the flexible touchpad (see block 350); and rendering the UI display at the flexible touchpad utilizing the presentation data (see block 355). In an exemplary embodiment, rendering the UI display includes presenting characters associated with each of the outwardly-extending protrusions, thus, portraying the outwardly-extending protrusions as a physically-extending keypad where each of the characters indicates the key identity of the outwardly-extending protrusions.

With reference to FIG. 4, a flow diagram is illustrated that shows a method 400 manipulating a set of moveable pins to produce a physically-extending keypad, in accordance with an embodiment of the present invention. Initially, a request is received at a processing unit of a touchscreen device, as indicated at block 405. In one instance, receiving may include, but is not limited to, detecting a user-initiated input via one or more of a set of movable pins that reside in the active condition (see block 410), and detecting the user-initiated input as being associated with a predefined configuration (see block 415). In another instance, receiving may include, but is not limited to, monitoring operations performed by an application (see block 420), and identifying one of the operations as being associated with a predefined configuration of the set of moveable pins (see block 425). As indicated at block 430, a determination of whether to manipulate the physically-extending keypad to address the request is made. If manipulating the physically-extending keypad is an appropriate response to the request (see block 435), an indication to activate an electromechanical device (e.g., electromechanical device 210 of FIG. 2) to adjust the physically-extending keypad consistent with the request is provided (see block 440). Conversely, if manipulating the physically-extending keypad is not an appropriate response to the request (see block 435), the present configuration of the physically-extending keypad is retained as it appears on the flexible touchpad of the touchscreen device (see block 445).

FIG. 5 is an exemplary physically-extending keypad accommodated on the touchscreen device 100 with an appearance that replicates an actual keyboard, in accordance with an embodiment of the present invention. In particular, this embodiment depicts an email mode of the touchscreen device 100 that is controlled by the configuration settings and presentation data communicated from an email application. Initially, outwardly-extending protrusions 125 form a physically-extending keyboard 510 that provides the appearance of an actual keyboard. In this way, each of the outwardly-extending protrusions 125 simulates a key of the physically-extending keyboard 510 and each provides a responsive tactile feedback in reaction to a user-initiated actuation. Alphanumeric characters 530 are displayed in association with each of the outwardly-extending protrusions 125, in accordance with the presentation data, thereby indicating the key function mapped to each of the outwardly-extending protrusions 125. Similarly, additional protrusions created by extended user-input elements are located at particular outwardly-extending protrusions 125 (e.g., "F" key, "J" key, or other dock position keys) to better assist in indicating the identity of the outwardly-extending protrusions 125 and to assist in simulating the appearance of an actual keyboard.

Additionally, the alphanumeric characters 530 alert the user to which of the user-input elements, which generate the outwardly-extending protrusions 125 in this instance, are set to the active condition. Alternatively, the remainder of the user-input elements that are not activated, or in an idle condition, are not as noticeable to the user. That is, the outwardly-extending protrusions 125 and/or the alphanumeric characters 530 emphasize the user-input elements in the active condition while suppressing the presence of those in the idle condition. Those of skill in the telecommunications industry will understand or appreciate that other methods of calling attention to the active user-input elements may be used and that embodiments of the invention are not limited to those shown and described.

In operation, a user is permitted to type at the physically-extending keyboard 510, which provides a tactile feedback indicating to the user that s/he has satisfactorily actuated a simulated key. Upon actuation, the command mapped to a simulated key is executed. In one instance, the command selects an alphanumeric character to be included in the text of an email message 520.

The email message 520 may also be affected by touch-sensitive keys 515. These touch sensitive keys 515 detect a user-initiated actuation via a capacitive/resistive touchscreen incorporated within the flexible touchpad, via user-input elements in the retracted orientation but in the active condition, or a combination thereof. The touch-sensitive keys 515, the email message 520, and the physically-extending keyboard 510 are located within the UI display 120. Accordingly, the UI display 120 is completely reconfigurable to render multimedia content, to provide touch-sensitive keys 515, and/or to provide outwardly-extending protrusions 125 that provide tactile feedback at any location on the UI display 120.

Figure 6:
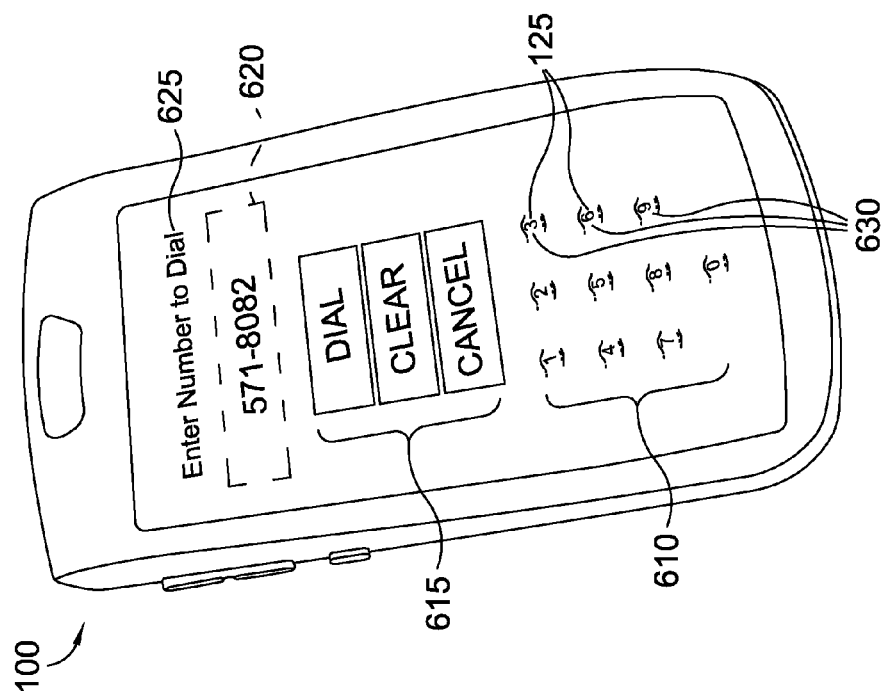
FIG. 6 is an exemplary physically-extending keypad accommodated on a touchscreen device with an appearance that replicates an actual dial pad, in accordance with an embodiment of the present invention.

Referring now to FIG. 6, an exemplary physically-extending keypad 610 accommodated on the touchscreen device 100 with an appearance that replicates an actual dial pad is shown, in accordance with an embodiment of the present invention. In particular, this embodiment depicts dial mode of the touchscreen device 100 that is controlled by the configuration settings and presentation data communicated from a dialing application. Initially, outwardly-extending protrusions 125 form a physically-extending keypad 610 that provides the appearance of an actual telephone dial pad. In this way, each of the outwardly-extending protrusions 125 simulates a key of the physically-extending keypad 610 and each provides a responsive tactile feedback in reaction to a user-initiated actuation. Numeric characters 630 are displayed in association with each of the outwardly-extending protrusions 125, in accordance with the presentation data, thereby indicating the key function mapped to each of the outwardly-extending protrusions 125. In addition, this embodiment includes touch-sensitive keys 615 that may facilitate editing or dialing an entered phone number, as rendered at display area 620 proximate to prompt 625.

In a similar embodiment (not shown), if the pattern of the outwardly-extending protrusions 125 expressed on the flexible touchpad is naturally intuitive to most users, such as the physically-extending keypad 610, the UI display may resist displaying the numeric characters 630 as they would be redundant.

Turning to FIG. 7, an exemplary physically-extending keypad accommodated on the touchscreen device 100 demonstrating a feature for providing content output via outwardly-extending protrusions 720 expressed at a flexible touchpad is shown, in accordance with an embodiment of the present invention. In particular, this embodiment is configured in a text-entry mode of the touchscreen device 100 that is controlled by the configuration settings and presentation data communicated from an instant-messaging application. Initially, outwardly-extending protrusions 125 form a physically-extending keyboard 510 that provides the appearance of an actual keyboard. In this way, each of the outwardly-extending protrusions 125 simulates a key of the physically-extending keyboard 510 and each provides a responsive tactile feedback in reaction to a user-initiated actuation. Alphanumeric characters 530 are displayed in association with each of the outwardly-extending protrusions 125, in accordance with the presentation data, thereby indicating the key function mapped to each of the outwardly-extending protrusions 125, as discussed above with reference to FIG. 5.

However, in the embodiment illustrated in FIG. 7, the physically-extending keyboard 510 is aligned laterally on the touchscreen device 100 (e.g., landscape view), thereby providing additional space between the outwardly-extending protrusions 125 to enable more accurate typing. Accordingly, the size of a display area 710 is diminished to accommodate the enlarged physically-extending keyboard 510. In one instance, the selection of the enlarged physically-extending keyboard 510, as opposed to the physically-extending keyboard 510 of FIG. 5, is based on user preferences embodied as predefined configurations (e.g., the predefined configuration 260 of FIG. 2). These predefined configurations may be determined by a user's capabilities (e.g., left-handed or right-handed), by what a user considers a logical arrangement (e.g., disposed vertically or horizontally on the UI display), and the like.

With continued reference to FIG. 7, a particular predefined configuration may be related to sight-related capabilities of a user. In this instance, outwardly-extending protrusions 720 may be expressed in display area 715, or any other location on the UI display, to relay a communication in Braille. That is, within the display area 715, one or more user-input elements are manipulated to the extended position to form a Braille correspondence. Generally, these user-input elements are not in the active condition, as an input is not expected within the display area 715. Additionally, the tactile feedback feature for the Braille may be available, or disengaged, according to the predefined configurations.

Figure 8:
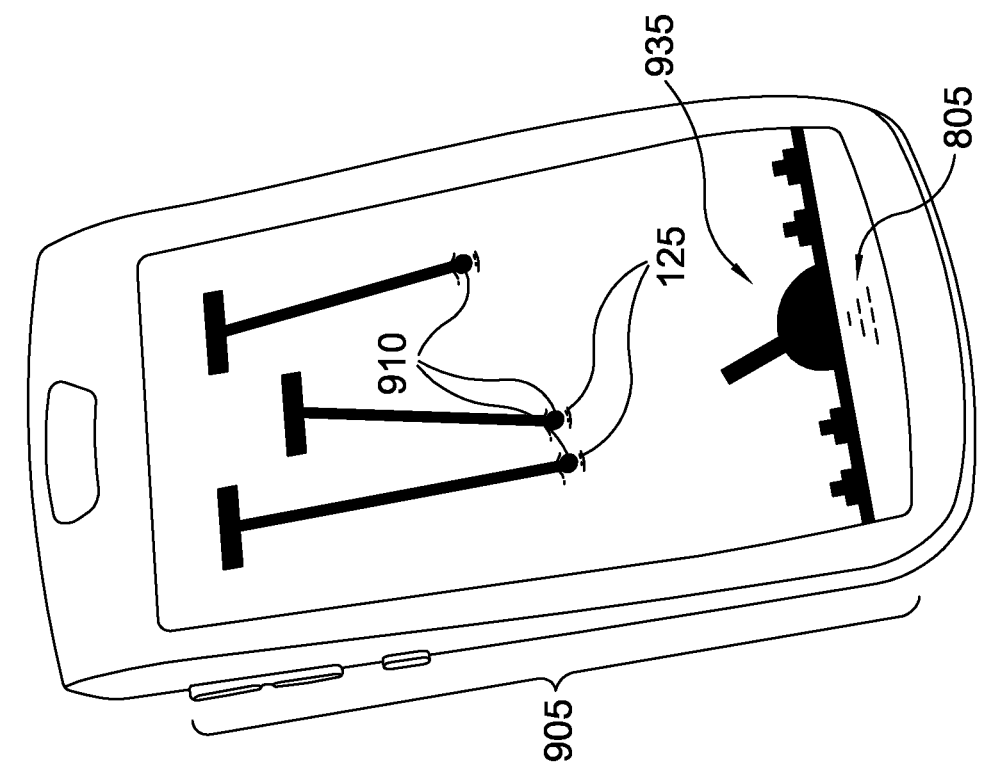
FIG. 8 is an exemplary configuration of outwardly-extending protrusions guided by operations of an application running on the touchscreen device, in accordance with an embodiment of the present invention.

Referring to FIG. 8, an exemplary configuration of outwardly-extending protrusions 125 guided by operations of an application running on the touchscreen device 100 is shown, in accordance with an embodiment of the present invention. In particular, this embodiment depicts interactive video mode of the touchscreen device 100 that is controlled by the configuration settings and presentation data communicated from a video application. Initially, outwardly-extending protrusions 125 are displayed in association with selectable graphic 910 of video content 905 rendered on a UI display. In this way, each of the outwardly-extending protrusions 125 may be actuated to influence the interactive video and each provides a responsive tactile feedback in reaction to the actuation. Additionally, a group of user-input elements 805 that are not in the extended orientation, but reside in the active condition, are provided to influence movement of a portion 935 of the interactive video. Although two different configurations of areas for accepting user-initiated actuations have been shown, it should be understood and appreciated by those of ordinary skill in the art that the UI display may be reconfigured to express a variety of combinations of active/idle and extended/retracted user-input elements as governed by configuration settings convey by the video application, and that the invention is not limited to those release mechanisms shown and described.

Figure 9:
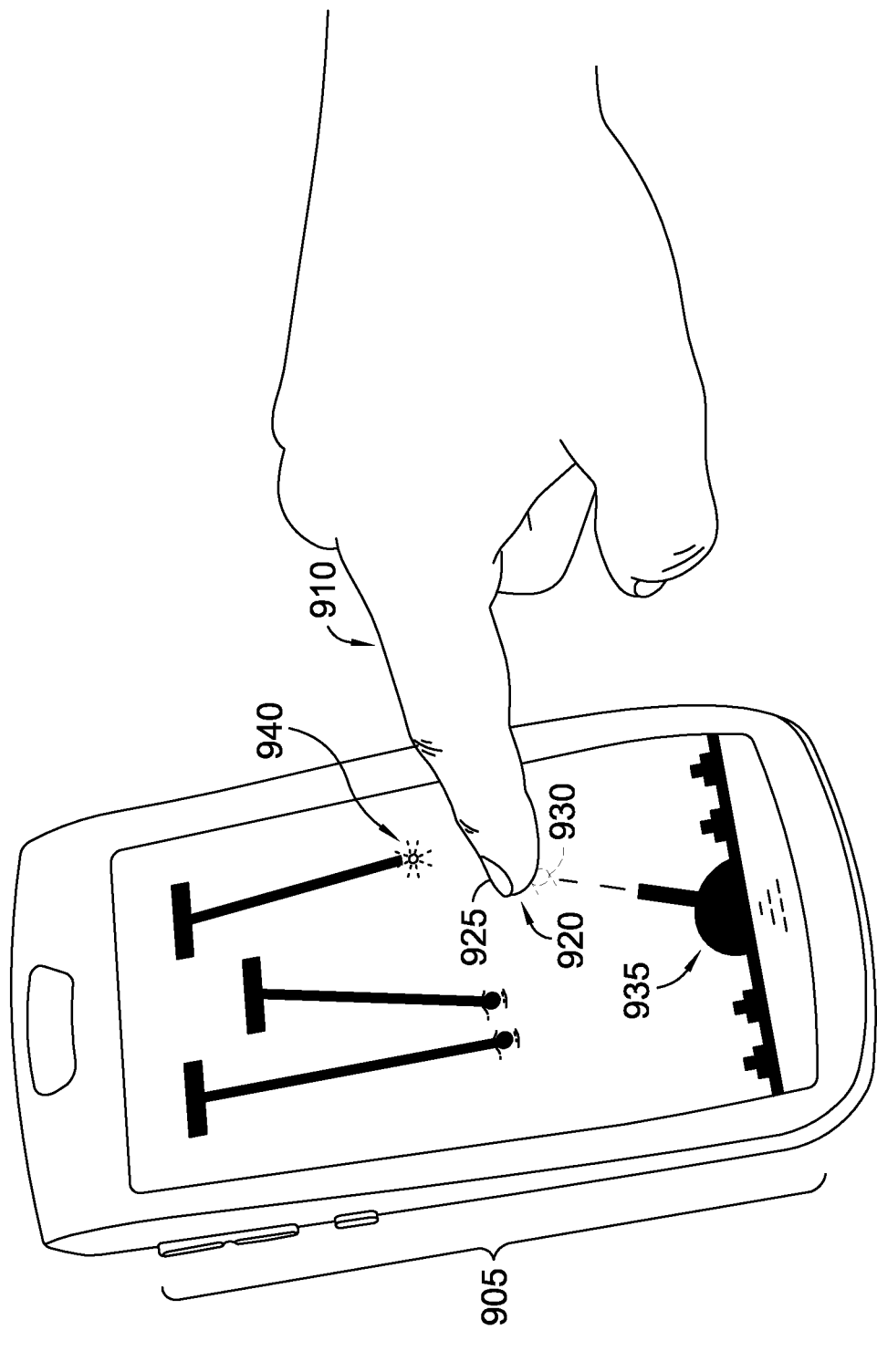
FIG. 9 is an exemplary configuration of outwardly-extending protrusions similar to the outwardly-extending protrusions of FIG. 8, but also incorporating user-initiated inputs when manipulating the user-input elements, in accordance with an embodiment of the present invention.

Referring to FIG. 9, an exemplary configuration of outwardly-extending protrusions similar to the outwardly-extending protrusions of FIG. 8 is shown, but also incorporating user-initiated inputs 920 when manipulating the user-input elements, in accordance with an embodiment of the present invention. In particular, this embodiment is configured to detect the user-initiated inputs 920 from a user 910 at some video content 905. As the user-initiated inputs 920 are expected by the video application at any point on the UI display, each of the user-input elements is set to an active condition. Accordingly, as the user 910 touches or drags a contact point 925 on the UI display, the video application recognizes the point of contact 925. Incident to recognizing the point of contact, the video application may leverage the ability to manipulate the video content 905 and the physical state of the user-input elements to provide the user 910 a robust interactive experience. In one instance, the portion 935 of the interactive video may adjust based on the recognized point of contact 925. In another instance, the execution of the interactive video is influenced 940 by the recognized point of contact. In yet another embodiment, outwardly-extending protrusion(s) 930 provide a pushback sensation proximate to the point of contact 925, thereby generating tactile feedback to the user 910 indicating that the user-initiated input 920 is being received.

Accordingly, the reconfigurable nature of the user-input elements provide for a robust user-interface environment that is flexible to generate a variety of tactile feedbacks to the user based on configurations settings from a variety of applications.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A touchscreen device capable of manipulating one or more user-input elements from a retracted or extended three-dimensional (3D) orientation and from an active or idle condition, the touchscreen device comprising:

the one or more user-input elements comprising a plurality of movable pins, wherein each movable pin in the plurality of movable pins is in the active or the idle condition, wherein each movable pin in the plurality of movable pins functions as a touch sensitive key when in the active condition such that, when functioning as the touch sensitive key, data is communicated to a user upon recognizing a user touch input, and wherein each movable pin in the plurality of movable pins functions as an idle key when in the idle condition such that, when functioning as the idle key, data is communicated to a user without recognizing the user touch input;

a processing unit for monitoring operations being carried out by one or more applications capable of running on the touchscreen device, and for automatically identifying one or more operations as being associated with first configuration settings of a first set of movable pins when a first application is running on the touchscreen device, and second configuration settings of a second set of movable pins when a second application distinct from the first application is running on the touchscreen device, and for accessing the first and second configuration settings at a storage location, wherein the one or more operations are invoked independently of user-initiated actuations entered to the touchscreen device;

a flexible touchpad for rendering a user-interface (UI) display, and for expressing at least a first and a second static physically-extending 3D keypad generated by the manipulation of the one or more user-input elements; and an electromechanical device for manipulating the plurality of movable pins according to a particular application presently running on the touchscreen device, the manipulating comprising:
  (a) when a first request is received at the processing unit from the first application running on the touchscreen device to manipulate the first set of movable pins according to the first configuration settings, each movable pin in the first set of movable pins is placed in the extended 3D orientation, rendering a first group of user-input elements to produce the first static physically-extending 3D keypad in a first predetermined area of the flexible touchpad, and
  (b) subsequently, when a second request is received at the processing unit from the second application running on the touchscreen device to manipulate the first set of movable pins to the retracted orientation and the second set of movable pins according to the second configuration settings, wherein the second configuration settings specify simultaneously adjusting the second set of movable pins to the extended 3D orientation in the active condition in a second predetermined area of the flexible touchpad, the extended 3D orientation in the idle condition in a third predetermined area of the flexible touchpad, wherein the third predetermined area is different from the second predetermined area, and the retracted orientation in the idle condition in a fourth predetermined area of the flexible touchpad, wherein the fourth predetermined area is different from the second and third predetermined areas of the flexible touchpad.

2. The touchscreen device of claim 1, wherein the plurality of movable pins is disposed in substantial perpendicular-spaced relation to the flexible touchpad.

3. The touchscreen device of claim 1, wherein the one or more user-input elements employ a spring-loaded mechanism to provide tactile feedback that imitates a click generated upon pressing a key on a normal electromechanical keyboard.

4. The touchscreen device of claim 1, wherein the flexible touchpad is a self-illuminating film that projects the UI display without the assistance of backlighting, wherein the self-illuminating film substantially overlays the one or more user-input elements and is in partial communicative contact therewith.

5. The touchscreen device of claim 1, wherein the flexible touchpad is an organic light-emitting diode (OLED).

6. The touchscreen device of claim 1, further comprising an application configured for providing one or more requests to the processing unit upon executing an operation of the application; wherein the one or more requests are associated with particular presentation data and particular configuration settings that correspond to the operation of the application.

7. The touchscreen device of claim 1, wherein the flexible touchpad is further configured for:
  displaying at least one character in association with each key in the first or second physically-extending 3D keypads, in accordance with the first and second configuration settings, respectively.

8. The touchscreen device of claim 1, wherein the second set of movable pins in the extended 3D orientation in the idle condition in the third predetermined area of the flexible touchpad form a pattern, wherein the pattern is rendered in a special format such that the pattern is intuitively readable to the user.

9. The touchscreen device of claim 2, wherein the plurality of movable pins is further configured for:
  receiving an actuation from the user;
  providing tactile feedback to the user incident to receipt of the actuation; and
  communicating an indication of the actuation to the processing unit.

10. A computerized method for manipulating one or more user-input elements to manage outwardly-extending protrusions expressed at a flexible touchpad incorporated in a touchscreen device, the computerized method comprising:
  monitoring one or more operations performed by a plurality of applications running the touchscreen device, wherein the one or more operations are invoked independently of user-initiated actuations entered to the touchscreen device;
  receiving a first request from a first application running on the touchscreen device to manipulate an expression of the outwardly-extending protrusions, wherein receiving the first request comprises:
    manipulating a first portion of the one or more user-input elements in accordance with first configuration settings, wherein manipulating comprises:
      (1) adjusting the first portion of the one or more user-input elements between positional states of an extended three-dimensional (3D) orientation and a retracted orientation in a first predetermined area of the flexible touchpad consistent with the first configuration settings,
      (2) adjusting the first portion of the one or more user-input elements to produce a first predefined static physically-extending 3D keypad in the first predetermined area of the flexible touchpad consistent with the first configuration settings, and
      (3) enabling or disabling sensing devices coupled to the one or more user-input elements that adjust the one or more user-input elements for communicating data to a user between modes of an active condition such that a user touch input is recognized, or an idle condition such that the user touch input is not recognized, respectively, consistent with the first configuration settings;
  rendering a user-interface (UI) display at the flexible touchpad according to the first request by adjusting the first portion of the one or more user-input elements to the extended 3D orientation in the first predetermined area of the flexible touchpad; and
  subsequently receiving a second request to manipulate the expression of the outwardly-extending protrusions from a second application different from the first application running on the touchscreen device, wherein receiving the second request comprises:
    manipulating a second portion of the one or more user-input elements different from the first portion in accordance with second configuration settings, wherein the manipulating comprises:
      (1) simultaneously adjusting the second portion of the one or more user-input elements to the extended 3D orientation in the active condition in a second predetermined area of the flexible touchpad, the extended 3D orientation in the idle condition in a third predetermined area of the flexible touchpad different from the second predetermined area, and the retracted orientation in the idle condition in a fourth predetermined area of the flexible touchpad different from the second and third predetermined areas of the flexible touchpad to produce a second predefined static physically-extending 3D keypad consistent with the second configuration settings; and rendering the UI display at the flexible touchpad according to the second request and returning the first portion of the one or more user-input elements to the retracted orientation.

11. The computerized method of claim 10, wherein rendering a UI display comprises:

extracting presentation data from the first or second request;

communicating the presentation data to the flexible touchpad; and rendering the UI display at the flexible touchpad to present one or more characters in association with each of the outwardly-extending protrusions.

12. The computerized method of claim 10, wherein manipulating a first portion of the one or more user-input elements further comprises:

identifying the first configuration settings as indicating an adjustment of the first portion of the one or more user-input elements to a text-entry mode; and manipulating the first portion of the one or more user-input elements such that the outwardly-extending protrusions replicate a physically-extending keypad.

13. The computerized method of claim 12, wherein manipulating a first portion of the one or more user-input elements further comprises manipulating the first portion of the one or more user-input elements to the extended 3D orientation, wherein the first portion of the one or more user-input elements reside in the active condition, and wherein a remainder of the one or more user-input elements reside in the retracted orientation and the idle condition.

14. The computerized method of claim 10, wherein the first request is a user-initiated actuation at a location on the flexible touchpad, and wherein the manipulated first portion of the one or more user-input elements are proximate to the location of the user-initiated actuation.

15. One or more non-transitory computer-readable media having computer-executable instructions embodied thereon that, when executed, perform a method for manipulating a group of movable pins in an active or an idle condition from a retracted or a physically-extending three-dimensional (3D) orientation to produce a physically-extending 3D keypad on a touchscreen device comprising a flexible touchpad, the method comprising:

monitoring one or more operations performed by a plurality of applications running on the touchscreen device, wherein the one or more operations are invoked independently of user-initiated actuations entered to the touchscreen device;

receiving a first request at a processing unit of the touchscreen device from a first application running on the touchscreen device;

identifying a first predefined keypad configuration setting associated with the first request, wherein the first predefined keypad configuration setting specifies a first group of movable pins in the active or idle condition to adjust to the extended 3D orientation in a first predetermined area of the flexible touchpad, wherein when in the active condition, data is communicated to a user recognizing a user touch input and when in the idle condition, the data is communicated to the user without recognizing the user touch input;

providing a first indication to activate an electromechanical device to adjust the first group of movable pins to the extended 3D orientation;

subsequently, receiving a second request from a second application different from the first application at the processing unit of the touchscreen device;

identifying a second predefined keypad configuration setting different from the first predefined keypad configuration setting, the second predefined keypad configuration setting being associated with the second request, wherein the second predefined keypad configuration setting specifies a second group of movable pins to simultaneously adjust to the extended 3D orientation in the active condition in a second predetermined area of the flexible touchpad, the extended 3D orientation in the idle condition in a third predetermined area of the flexible touchpad different from the second predetermined area, and the retracted orientation in the idle condition in a fourth predetermined area of the flexible touchpad different from the second and third predetermined areas of the flexible touchpad; and providing a second indication to activate the electromechanical device to adjust the second group of movable pins to the extended 3D and retracted orientations and return the first group of movable pins to the retracted orientation.

16. The media of claim 15, wherein a third request from the user is received at the processing unit of the touchscreen device, wherein receiving the third request comprises:

detecting a user-initiated input via at least a portion of the group of movable pins in the active condition; and identifying the user-initiated input as being associated with a third predefined keypad configuration setting that is distinct from the first and second predefined keypad configuration settings.

17. The media of claim 16, wherein receiving the user-initiated input comprises receiving an indication to execute a key-entry function manipulating a third group of movable pins in the group of movable pins, and wherein the third predefined keypad configuration setting of the physically-extending 3D keypad is an alphanumeric pattern of outwardly-extending protrusions in the active condition, expressed at the flexible touchpad.

18. The media of claim 16, wherein whether manipulating the physically-extending 3D keypad is appropriate to address the third request is determined by identifying the third request as a call to present content on the flexible touchpad as outwardly-extending protrusions in the idle condition.

* * * * *